United States Patent
Papa et al.

(10) Patent No.: US 12,372,010 B1
(45) Date of Patent: Jul. 29, 2025

(54) PASSIVE VENTILATION SYSTEM FOR TAIL CONE ZONE

(71) Applicant: RTX Corporation, Farmington, CT (US)

(72) Inventors: Federico Papa, Port Saint Lucie, FL (US); Eric J. Heims, Avon, CT (US); Reza Rezvani, Bolton, CT (US); Yuan J. Qiu, Glastonbury, CT (US); William K. Ackermann, East Hartford, CT (US)

(73) Assignee: RTX Corporation, Farmington, CT (US)

( * ) Notice: Subject to any disclaimer, the term of this patent is extended or adjusted under 35 U.S.C. 154(b) by 2 days.

(21) Appl. No.: 18/423,446

(22) Filed: Jan. 26, 2024

(51) Int. Cl.
   *F01D 25/14* (2006.01)
   *F01D 25/12* (2006.01)
   *F02C 7/18* (2006.01)

(52) U.S. Cl.
   CPC ............. *F01D 25/14* (2013.01); *F01D 25/12* (2013.01); *F02C 7/18* (2013.01); *F05D 2260/232* (2013.01)

(58) Field of Classification Search
   CPC .... F01D 25/14; F01D 25/12; F05D 2260/232; F02C 7/18; F02C 7/12; F02C 7/14
   See application file for complete search history.

(56) References Cited

U.S. PATENT DOCUMENTS

| | | | |
|---|---|---|---|
| 3,970,252 A | 7/1976 | Smale et al. | |
| 4,044,555 A | 8/1977 | McLoughlin et al. | |
| 6,092,360 A * | 7/2000 | Hoag | F02C 7/32 60/39.83 |
| 7,805,925 B2 | 10/2010 | Durocher et al. | |
| 9,003,811 B2 | 4/2015 | Barnett et al. | |
| 11,162,379 B2 * | 11/2021 | Spierling | H02K 7/1823 |
| 11,242,156 B2 * | 2/2022 | Spierling | B64D 27/10 |
| 11,702,986 B2 | 7/2023 | Roberge | |
| 11,821,370 B2 | 11/2023 | Pal | |

* cited by examiner

*Primary Examiner* — Eldon T Brockman
(74) *Attorney, Agent, or Firm* — Bachman & LaPointe P.C.

(57) ABSTRACT

A tail cone ventilation system including a tail cone case defining a tail cone interior and a tail cone exterior, the tail cone having a forward portion and an aft portion separated axially along a tail cone axis; a distribution manifold located within the tail cone interior proximate the forward portion, wherein the distribution manifold comprises nozzles arranged radially around the axis, the nozzles configured to direct a cooling air over at least one electronic component within the tail cone interior and along an inner surface of the tail cone case; an air inlet fluidly coupled with the distribution manifold through ducting, the air inlet located externally from the tail cone interior; and a tail cone discharge located proximate the tail cone aft portion, the tail cone discharge being fluidly coupled with the distribution manifold.

20 Claims, 2 Drawing Sheets

PASSIVE VENTILATION SYSTEM FOR TAIL CONE ZONE

BACKGROUND

The present disclosure is directed to the improved passive ventilation of electronics located in a tail cone zone.

Future hybrid engine programs might require installation of electronics in the tail cone zone. The electronics can include generators, electrical motors, power feed cables, processor electronics, and the like. These electronics may have a low thermal capability and produce excess thermal energy that can develop temperatures which can damage or degrade the electronics. This new location for components with low thermal capability requires a ventilation system capable of maintaining temperatures within predetermined operational limits.

SUMMARY

In accordance with the present disclosure, there is provided a tail cone ventilation system comprising a tail cone case defining a tail cone interior and a tail cone exterior, the tail cone having a forward portion and an aft portion separated axially along a tail cone axis; a distribution manifold located within the tail cone interior proximate the forward portion, wherein the distribution manifold comprises nozzles arranged radially around the axis, the nozzles configured to direct a cooling air over at least one electronic component within the tail cone interior and along an inner surface of the tail cone case; an air inlet fluidly coupled with the distribution manifold through ducting, the air inlet located externally from the tail cone interior; and a tail cone discharge located proximate the tail cone aft portion, the tail cone discharge being fluidly coupled with the distribution manifold.

A further embodiment of any of the foregoing embodiments may additionally and/or alternatively include the distribution manifold comprises a circular torus located concentric around the tail cone axis.

A further embodiment of any of the foregoing embodiments may additionally and/or alternatively include the distribution manifold comprises more than one torus of varying circumferences, located at various distances from the tail cone forward portion along the axis A.

A further embodiment of any of the foregoing embodiments may additionally and/or alternatively include the air inlet comprises an air scoop design configured to receive air flowing past an outer surface.

A further embodiment of any of the foregoing embodiments may additionally and/or alternatively include the tail cone ventilation system further comprising a conduit attached to the tail cone case at the tail cone exterior and to a pylon at an opposite end, the conduit comprising a cable chase having cable, the cable being in operative communication with the at least one electronic component within the tail cone interior, the cable chase being isolated from the tail cone interior by a firewall, a cooling supply fluidly coupled with the cable chase, the cooling supply configured to cool the cable within the cable chase.

A further embodiment of any of the foregoing embodiments may additionally and/or alternatively include the tail cone ventilation system further comprising a pylon air scoop fluidly coupled to the cable chase, wherein the pylon air scoop is configured to direct the cooling air to the cable chase through internal flow passages.

A further embodiment of any of the foregoing embodiments may additionally and/or alternatively include the nozzles are configured to direct the cooling air along an inner surface of the tail cone case forming a cooling film layer.

In accordance with the present disclosure, there is provided a tail cone ventilation system comprising a gas turbine engine aft portion; a tail cone case attached to the gas turbine aft portion; the tail cone case defining a tail cone interior and a tail cone exterior, the tail cone having a forward portion and an aft portion separated axially along a tail cone axis; a distribution manifold located within the tail cone interior proximate the forward portion, wherein the distribution manifold comprises nozzles arranged radially around the axis, the nozzles configured to direct a cooling air over at least one electronic component and along an inner surface of the tail cone case; an air inlet fluidly coupled with the distribution manifold through ducting, the air inlet located externally from the tail cone interior; and a tail cone discharge located proximate the tail cone aft portion, the tail cone discharge being fluidly coupled with the distribution manifold.

A further embodiment of any of the foregoing embodiments may additionally and/or alternatively include the tail cone ventilation system further comprising insulation attached to the tail cone case between the tail cone interior and the tail cone exterior.

A further embodiment of any of the foregoing embodiments may additionally and/or alternatively include the distribution manifold comprises a circular torus located concentric around the tail cone axis.

A further embodiment of any of the foregoing embodiments may additionally and/or alternatively include the distribution manifold comprises more than one torus of varying circumferences, located at various distances from the tail cone forward portion along the axis A.

A further embodiment of any of the foregoing embodiments may additionally and/or alternatively include the tail cone ventilation system, further comprising a conduit attached to the tail cone case at the tail cone exterior and to a pylon at an opposite end, the conduit comprising a cable chase having cable, the cable being in operative communication with the at least one electronic component within the tail cone interior, the cable chase being isolated from the tail cone interior by a firewall, a cooling supply fluidly coupled with the cable chase, the cooling supply configured to cool the cable within the cable chase.

A further embodiment of any of the foregoing embodiments may additionally and/or alternatively include the nozzles are configured to direct the cooling air along an inner surface of the tail cone case forming a cooling film layer.

In accordance with the present disclosure, there is provided a process for cooling a tail cone interior comprising attaching a tail cone case to a gas turbine engine aft portion, the tail cone case defining a tail cone interior and a tail cone exterior, the tail cone having a forward portion and an aft portion separated axially along a tail cone axis; locating a distribution manifold within the tail cone interior proximate the forward portion; forming nozzles on the distribution manifold, the nozzles arranged radially around the axis; configuring the nozzles to direct a cooling air over at least one electronic component within the tail cone case; configuring the nozzles to direct a cooling air along an inner surface of the tail cone case; fluidly coupling an air inlet with the distribution manifold through ducting, the air inlet located externally from the tail cone interior; locating a tail cone discharge proximate the tail cone aft portion; and fluidly coupling the tail cone discharge with the distribution manifold.

A further embodiment of any of the foregoing embodiments may additionally and/or alternatively include the distribution manifold comprises a circular torus located concentric around the tail cone axis.

A further embodiment of any of the foregoing embodiments may additionally and/or alternatively include the distribution manifold comprises more than one torus of varying circumferences, located at various distances from the tail cone forward portion along the axis A.

A further embodiment of any of the foregoing embodiments may additionally and/or alternatively include the process further comprising attaching a conduit to the tail cone case at the tail cone exterior and to a pylon at an opposite end, the conduit comprising a cable chase having cable, the cable being in operative communication with the at least one electronic component within the tail cone interior, the cable chase being isolated from the tail cone interior by a firewall, a cooling supply fluidly coupled with the cable chase, the cooling supply configured to cool the cable within the cable chase.

A further embodiment of any of the foregoing embodiments may additionally and/or alternatively include the process further comprising attaching insulation to the tail cone case between the tail cone interior and the tail cone exterior.

A further embodiment of any of the foregoing embodiments may additionally and/or alternatively include the process further comprising configuring the nozzles to direct the cooling air along an inner surface of the tail cone case forming a cooling film layer.

A further embodiment of any of the foregoing embodiments may additionally and/or alternatively include the process further comprising fluidly coupling a pylon air scoop to the cable chase; and configuring the pylon air scoop to direct the cooling air to the cable chase through internal flow passages.

Other details of the tail cone ventilation system are set forth in the following detailed description and the accompanying drawings wherein like reference numerals depict like elements.

DETAILED DESCRIPTION

Figure 1:
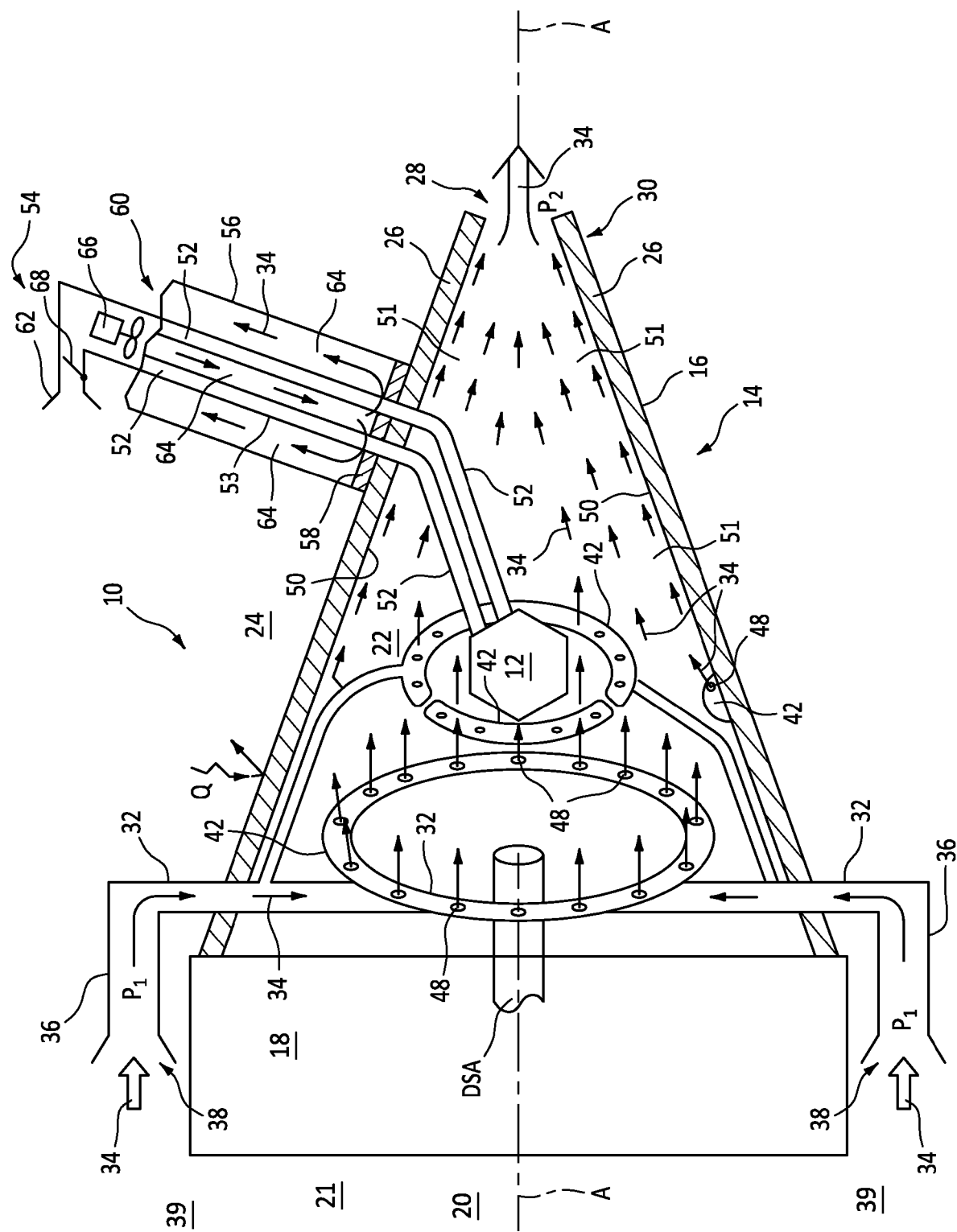
FIG. 1 is a partial cross-section schematic representation of an exemplary ventilation system for the tail cone zone.
Figure 2:
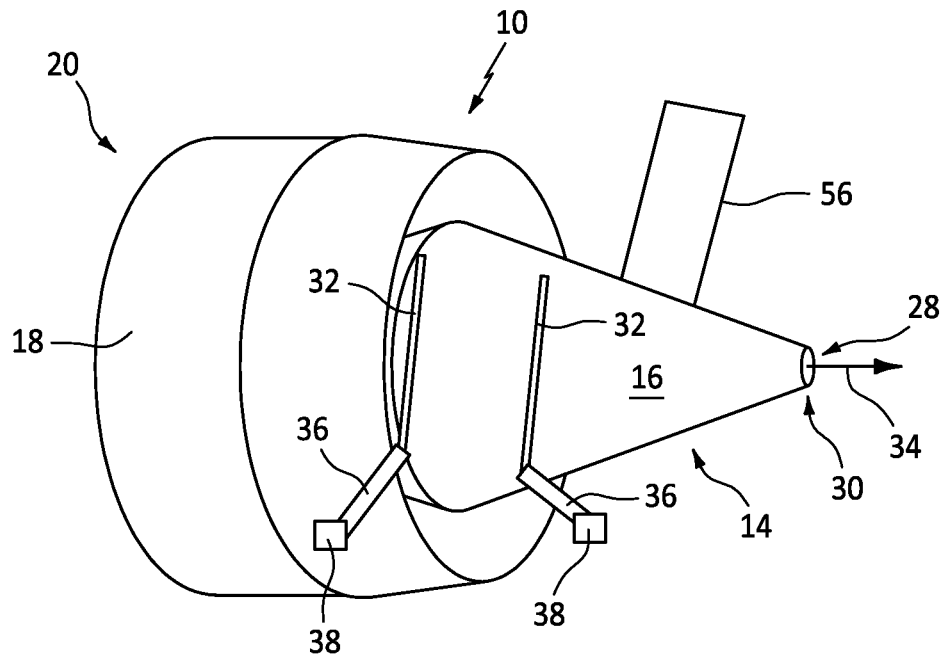
FIG. 2 is an external isometric schematic representation of an exemplary ventilation system for the tail cone zone.
Figure 3:
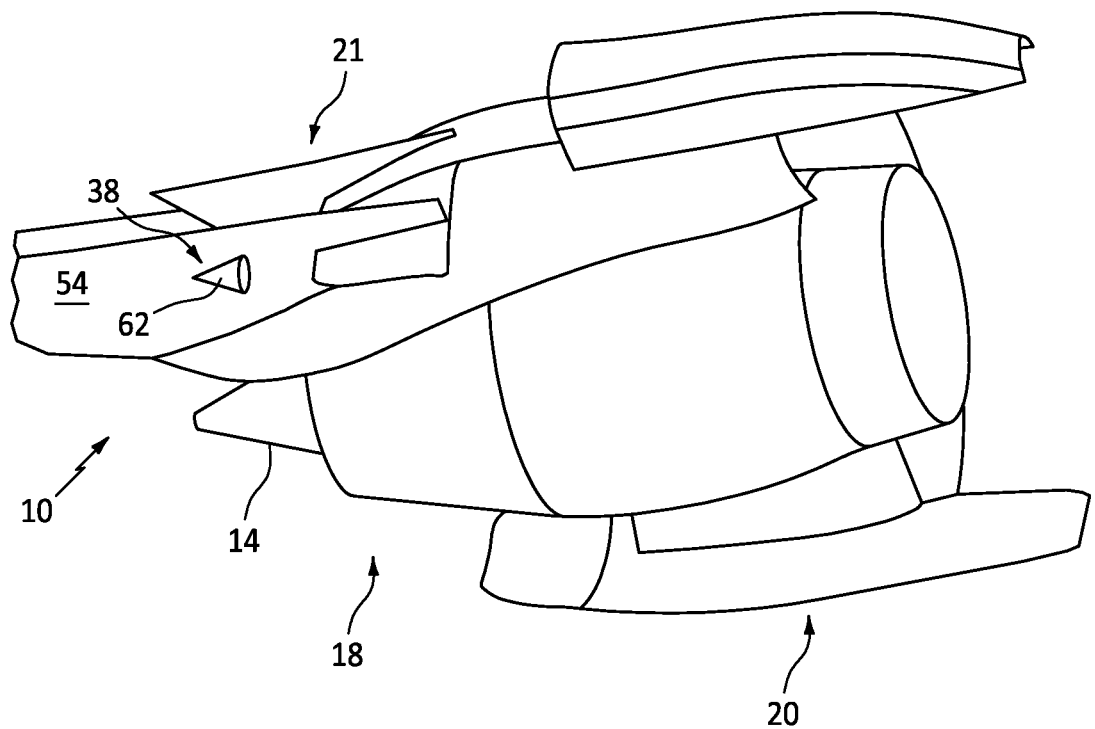
FIG. 3 is an external isometric schematic representation of an exemplary gas turbine engine with an exemplary ventilation system for the tail cone zone.

Referring now to FIG. 1, FIG. 2 and FIG. 3, there is illustrated an exemplary ventilation system 10. The ventilation system 10 is configured to cool electronic components 12 located within the tail cone 14. The electronic components 12 can include a generator, electrical motors, power feeder cables, processor electronics, and the like.

The tail cone 14 includes a tail cone case 16 coupled to an aft portion 18 of a gas turbine engine 20. The tail cone case 16 defines a tail cone interior 22 and a tail cone exterior 24. The tail cone case 16 includes insulation 26 covering the tail cone case 16 between the tail cone interior 22 and the tail cone exterior 24. The insulation 26 inhibits the transfer of thermal energy Q across the tail cone case 16. The insulation 26 helps to maintain the tail cone interior 22 at predetermined temperatures. The tail cone case 16 includes a tail cone discharge 28 located proximate a tail cone aft portion 30.

The passive ventilation system 10 includes ducting 32 configured to transport cooling air 34 from the tail cone exterior 24 through the tail cone case 16 and into the tail cone interior 22. The ducting 32 is shown with two supply branches 36, although in exemplary embodiments a single supply or multiple supply branches are contemplated. The supply branches 36 capture cooling air 34 at an air inlet 38 located at the tail cone exterior 24. The air pressure P1 at the air inlet 38 is greater than the air pressure P2 at the tail cone discharge 28. Thus, a positive ventilation rate can be maintained throughout the tail cone interior 22. The air inlet 38 can be configured as an air scoop design that is configured to receive air flowing past an outer surface 40 of the gas turbine engine 20 or vehicle 21 powered by the gas turbine engine 20. The air scoop design can be shaped with a bell-mouth and lower profile to meet the requirements of an external shape on the outer surface 40 of the vehicle or gas turbine engine 20. The air inlet 38 can be located on lower quadrants of a fan duct 39 of the gas turbine engine 20 or on an inner fixed structure of the vehicle 21.

The ventilation system 10 includes a distribution manifold 42 located within the tail cone interior 22 proximate a forward portion 44 of the tail cone 14. The forward portion 44 of the tail cone 14 is opposite the aft portion 30. The distribution manifold 42 receives cooling air 34 from the air inlet 38 through the ducting 32 and distributes the cooling air 34 into the tail cone interior 22 in order to cool the electronics 12 within the tail cone interior 22. The cooling air 34 flows through the tail cone interior 22 from the forward portion 44 aft toward the aft portion 30. The cooling air 34 flows through the tail cone discharge 28 to exit the tail cone interior 22. The cooling air 34 is at a predetermined temperature range which provides a cooling sink to remove thermal energy from the electronic components 12.

The distribution manifold 42 is shown as a circular torus located concentric around a tail cone axis A. The tail cone axis A can be aligned with a drive shaft axis DSA for a generator within the tail cone interior 22. The torus is configured to match the circular shape of the tail cone 14 and maximize the distribution of the cooling air 34 inside the tail cone interior 22 across the electronic components 12 and the tail cone case 16. In alternative embodiments, the distribution manifold 42 can be shaped, such as a cooling halo, to uniformly distribute the cooling air 34 throughout the tail cone interior 22 for cooling the electronic components 12 as well as the tail cone case 16. The distribution manifold 42 can be formed in multiple parts, such as more than one torus. The distribution manifolds 42 can be made of varying circumferences, located at various distances from the tail cone forward portion along the axis A. The distribution manifold 42 can be constructed as two semi-circles, each being fed by a separate supply branch 36. The distribution manifold 42 can be formed integral with the tail cone case 16.

The distribution manifold 42 can include nozzles 48 that discharge the cooling air 34 into the tail cone interior 22. The nozzles 48 can be configured to direct the cooling air 34 to particular electronic components 12 located within the tail cone interior 22. The nozzles 48 can be configured to direct the cooling air 34 along an inner surface 50 of the tail cone case 16 forming a cooling film layer 51. The cooling film layer 51 of cooling air 34 flowing along the inner surface 50 can inhibit the transfer of thermal energy Q into the tail cone interior 22 from the tail cone exterior 24.

The electronic components 12 require cable(s) 52 to supply/distribute electrical power and/or control signals with the gas turbine engine 20 or vehicle 21. The cables 52 can be fed to the tail cone interior 22 from a conduit 53. A cable chase 56 can be formed inside the conduit 53. The cable chase 56 can support the cable 52 within the conduit 53. The cable chase 56 can be isolated from the tail cone interior 22 by use of a firewall 58. The firewall 58 prevents fire penetration from the cable chase 56 to the tail cone interior 22. Since the cable chase 56 is isolated from the tail cone interior 22, a cooling supply 60 is provided to the conduit 53. The cooling supply 60 is fed from the pylon 54. A pylon air scoop 62 can be fluidly coupled to the cable chase 56. The pylon air scoop 62 can direct cooling air 34 to the cable chase 56 through internal flow passages 64. A fire damper 68 can be outfitted in the ducting 32 to prevent fire from spreading from the cable chase 56 into the tail cone interior 22.

A fan 66 can be fluidly coupled to the cable chase 56 within the conduit 53. Internal flow passages 64 direct the cooling air 34 into the cable chase 56 and out of the cable chase 56 to cool the cable 52. The fan 66 can be utilized under operating conditions when the cooling air 34 outside the pylon 54 is stagnant, such as during engine shut down conditions.

In an alternative embodiment, the cable chase 56 of the pylon 54 is isolated from the tail cone interior 22 with no cooling for the cables 52.

A technical advantage of the disclosed tail cone ventilation system can include a concept of ventilation for the tail cone using gas turbine fan discharge air.

Another technical advantage of the disclosed tail cone ventilation system can include providing a supply of cooling air to maintain the electronic components within predetermined temperature limits.

Another technical advantage of the disclosed tail cone ventilation system can include reducing the risk of fire within the tail cone interior or conduit by separating them from each other by a firewall.

Another technical advantage of the disclosed tail cone ventilation system can include providing positive ventilation rates through the tail cone interior.

There has been provided a tail cone ventilation system. While the tail cone ventilation system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A tail cone ventilation system comprising:
   a tail cone case defining a tail cone interior and a tail cone exterior, the tail cone having a forward portion and an aft portion separated axially along a tail cone axis;
   a distribution manifold located within the tail cone interior proximate the forward portion, wherein the distribution manifold comprises nozzles arranged radially around the axis, the nozzles configured to direct a cooling air over at least one electronic component within the tail cone interior and along an inner surface of the tail cone case;
   an air inlet fluidly coupled with the distribution manifold through ducting, the air inlet located externally from the tail cone interior; and
   a tail cone discharge located proximate the tail cone aft portion, the tail cone discharge being fluidly coupled with the distribution manifold.

2. The tail cone ventilation system according to claim 1, wherein the distribution manifold comprises a circular torus located concentric around the tail cone axis.

3. The tail cone ventilation system according to claim 1, wherein the distribution manifold comprises more than one torus of varying circumferences, located at various distances from the tail cone forward portion along the tail cone axis.

4. The tail cone ventilation system according to claim 1, wherein the air inlet comprises an air scoop design configured to receive air flowing past an outer surface.

5. The tail cone ventilation system according to claim 1, further comprising:
   a conduit attached to the tail cone case at the tail cone exterior and to a pylon at an opposite end, the conduit comprising a cable chase having cable, the cable being in operative communication with the at least one electronic component within the tail cone interior, the cable chase being isolated from the tail cone interior by a firewall, a cooling supply fluidly coupled with the cable chase, the cooling supply configured to cool the cable within the cable chase.

6. The tail cone ventilation system according to claim 5, further comprising:
   a pylon air scoop fluidly coupled to the cable chase, wherein the pylon air scoop is configured to direct the cooling air to the cable chase through internal flow passages.

7. The tail cone ventilation system according to claim 1, wherein the nozzles are configured to direct the cooling air along an inner surface of the tail cone case forming a cooling film layer.

8. A tail cone ventilation system comprising:
   a gas turbine engine aft portion;
   a tail cone case attached to the gas turbine aft portion; the tail cone case defining a tail cone interior and a tail cone exterior, the tail cone having a forward portion and an aft portion separated axially along a tail cone axis;
   a distribution manifold located within the tail cone interior proximate the forward portion, wherein the distribution manifold comprises nozzles arranged radially around the axis, the nozzles configured to direct a cooling air over at least one electronic component and along an inner surface of the tail cone case;
   an air inlet fluidly coupled with the distribution manifold through ducting, the air inlet located externally from the tail cone interior; and
   a tail cone discharge located proximate the tail cone aft portion, the tail cone discharge being fluidly coupled with the distribution manifold.

9. The tail cone ventilation system according to claim 8, further comprising:
   insulation attached to the tail cone case between the tail cone interior and the tail cone exterior.

10. The tail cone ventilation system according to claim 8, wherein the distribution manifold comprises a circular torus located concentric around the tail cone axis.

11. The tail cone ventilation system according to claim 8, wherein the distribution manifold comprises more than one torus of varying circumferences, located at various distances from the tail cone forward portion along the tail cone axis.

12. The tail cone ventilation system according to claim 8, further comprising:
a conduit attached to the tail cone case at the tail cone exterior and to a pylon at an opposite end, the conduit comprising a cable chase having cable, the cable being in operative communication with the at least one electronic component within the tail cone interior, the cable chase being isolated from the tail cone interior by a firewall, a cooling supply fluidly coupled with the cable chase, the cooling supply configured to cool the cable within the cable chase.

13. The tail cone ventilation system according to claim 8, wherein the nozzles are configured to direct the cooling air along an inner surface of the tail cone case forming a cooling film layer.

14. A process for cooling a tail cone interior comprising:
attaching a tail cone case to a gas turbine engine aft portion, the tail cone case defining a tail cone interior and a tail cone exterior, the tail cone having a forward portion and an aft portion separated axially along a tail cone axis;
locating a distribution manifold within the tail cone interior proximate the forward portion;
forming nozzles on the distribution manifold, the nozzles arranged radially around the tail cone axis;
configuring the nozzles to direct a cooling air over at least one electronic component within the tail cone case;
configuring the nozzles to direct a cooling air along an inner surface of the tail cone case;
fluidly coupling an air inlet with the distribution manifold through ducting, the air inlet located externally from the tail cone interior;
locating a tail cone discharge proximate the tail cone aft portion; and
fluidly coupling the tail cone discharge with the distribution manifold.

15. The process of claim 14, wherein the distribution manifold comprises a circular torus located concentric around the tail cone axis.

16. The process of claim 14, wherein the distribution manifold comprises more than one torus of varying circumferences, located at various distances from the tail cone forward portion along the tail cone axis.

17. The process of claim 14, further comprising:
attaching a conduit to the tail cone case at the tail cone exterior and to a pylon at an opposite end, the conduit comprising a cable chase having cable, the cable being in operative communication with the at least one electronic component within the tail cone interior, the cable chase being isolated from the tail cone interior by a firewall, a cooling supply fluidly coupled with the cable chase, the cooling supply configured to cool the cable within the cable chase.

18. The process of claim 14, further comprising:
attaching insulation to the tail cone case between the tail cone interior and the tail cone exterior.

19. The process of claim 14, further comprising:
configuring the nozzles to direct the cooling air along an inner surface of the tail cone case forming a cooling film layer.

20. The process of claim 14, further comprising:
fluidly coupling a pylon air scoop to the cable chase; and
configuring the pylon air scoop to direct the cooling air to the cable chase through internal flow passages.

* * * * *